Sept. 17, 1946.  J. P. DE ROSE  2,407,771
SEAT SUPPORT
Filed Aug. 4, 1941  5 Sheets-Sheet 1
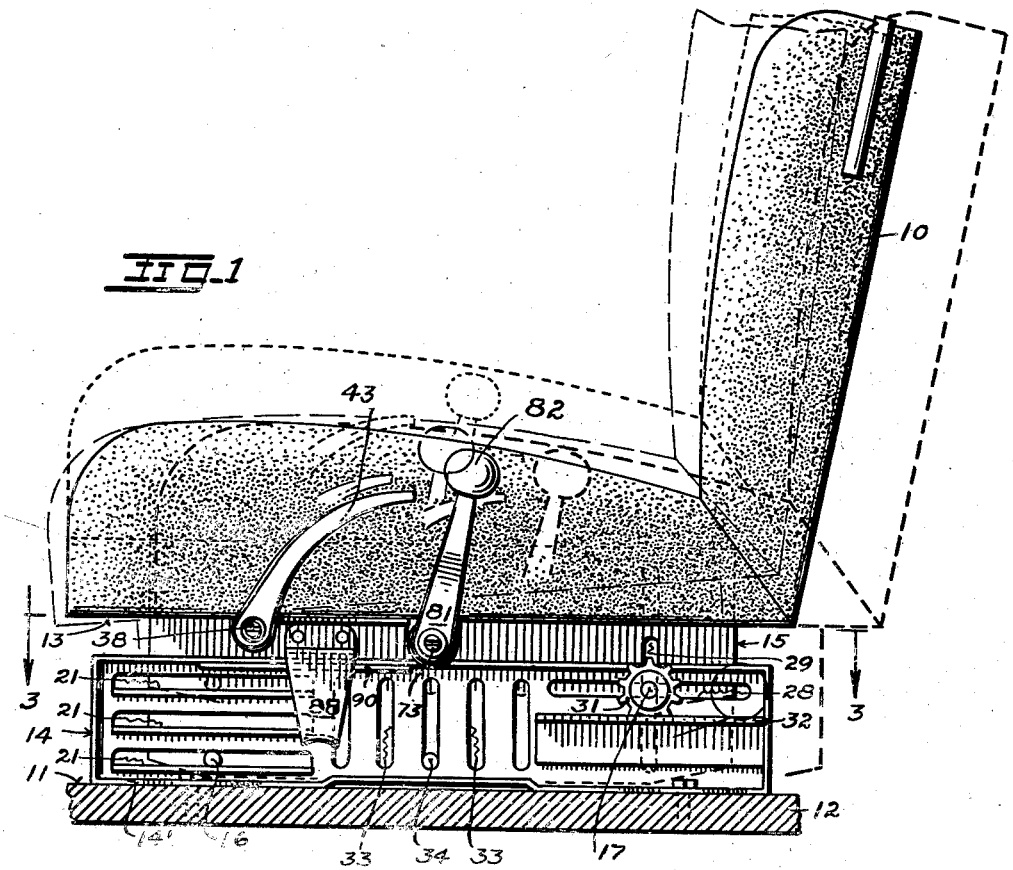
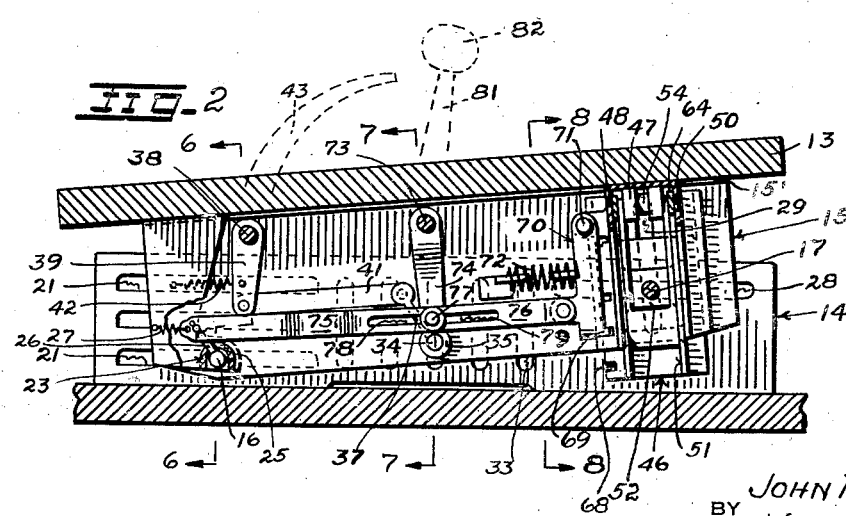
INVENTOR
JOHN P. DeROSE
BY Henry N. Young
ATTORNEY

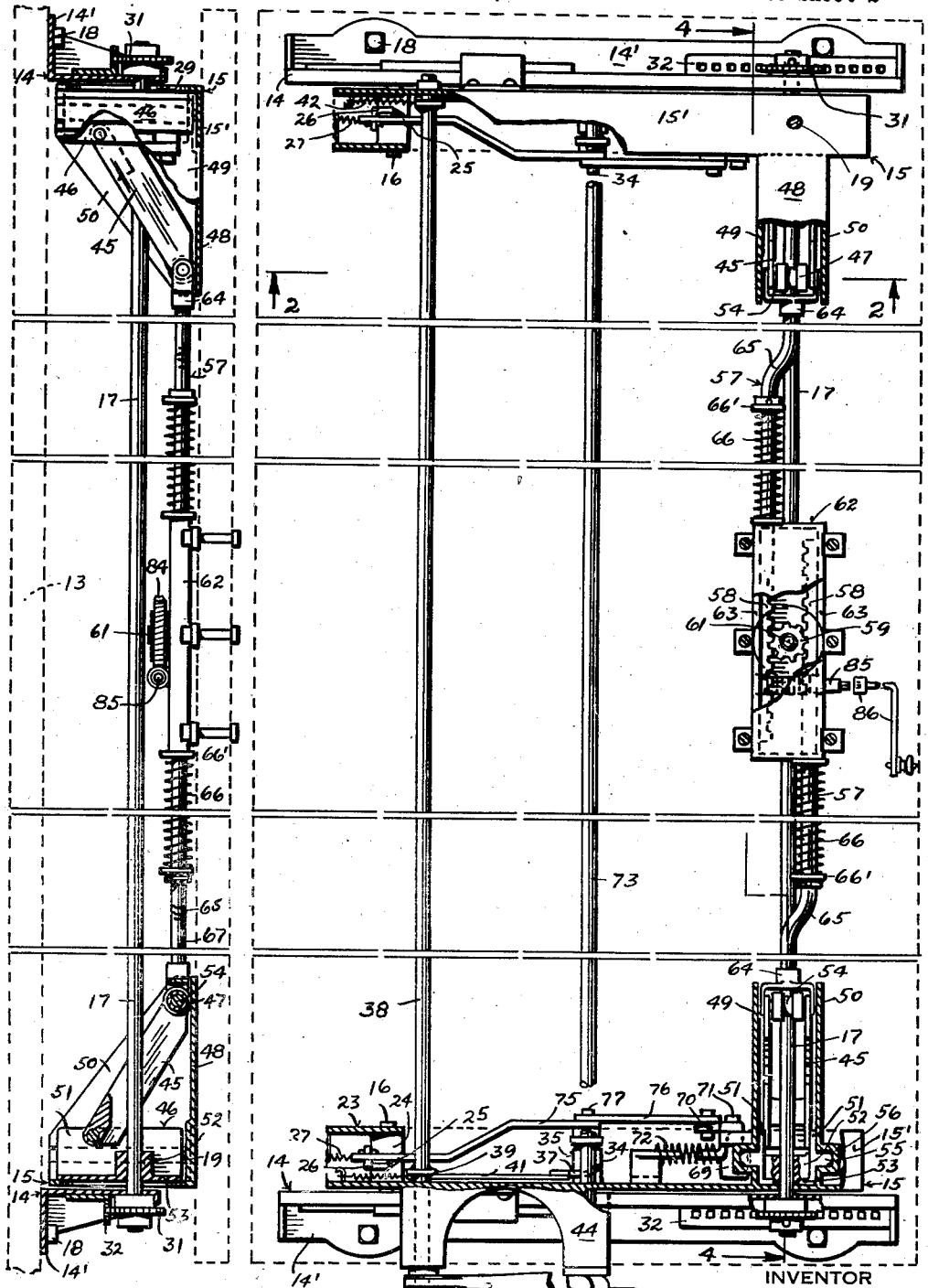

Sept. 17, 1946.   J. P. DE ROSE   2,407,771
SEAT SUPPORT
Filed Aug. 4, 1941   5 Sheets-Sheet 3
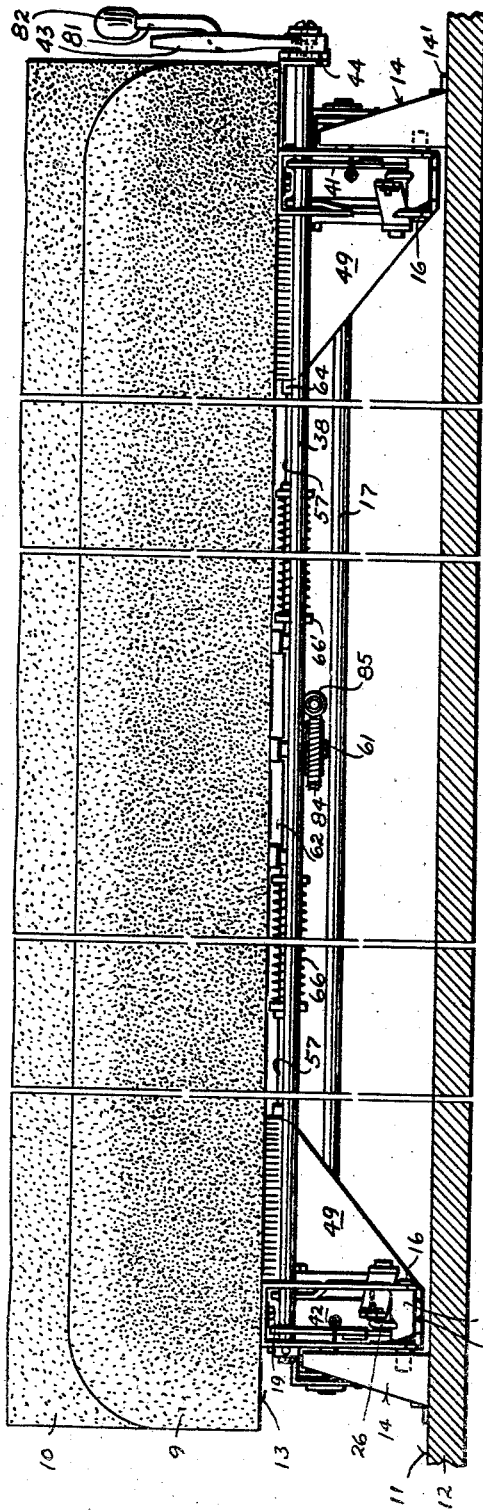
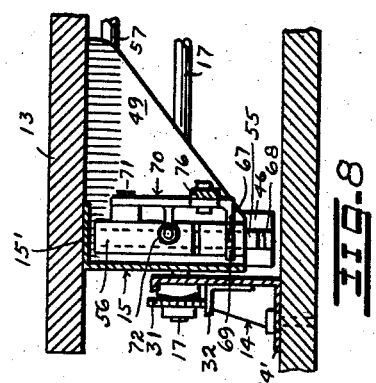
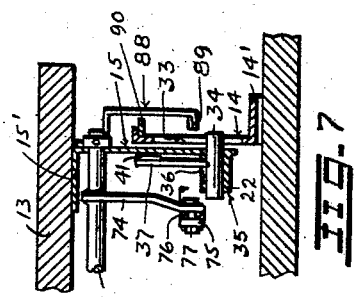
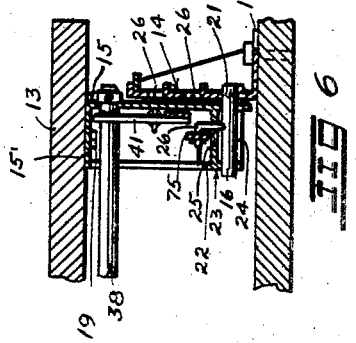
INVENTOR
JOHN P. DEROSE
BY Henry N. Young
ATTORNEY

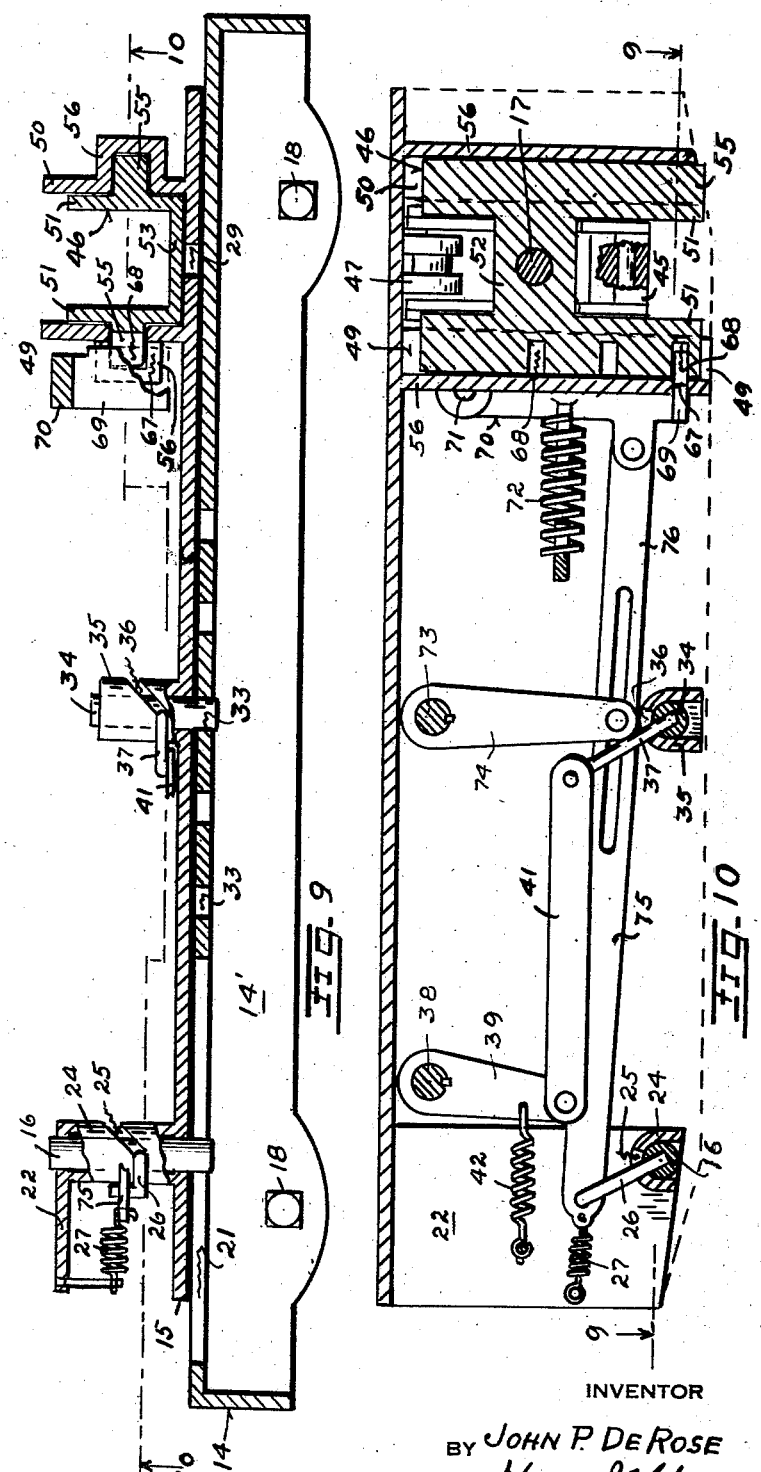

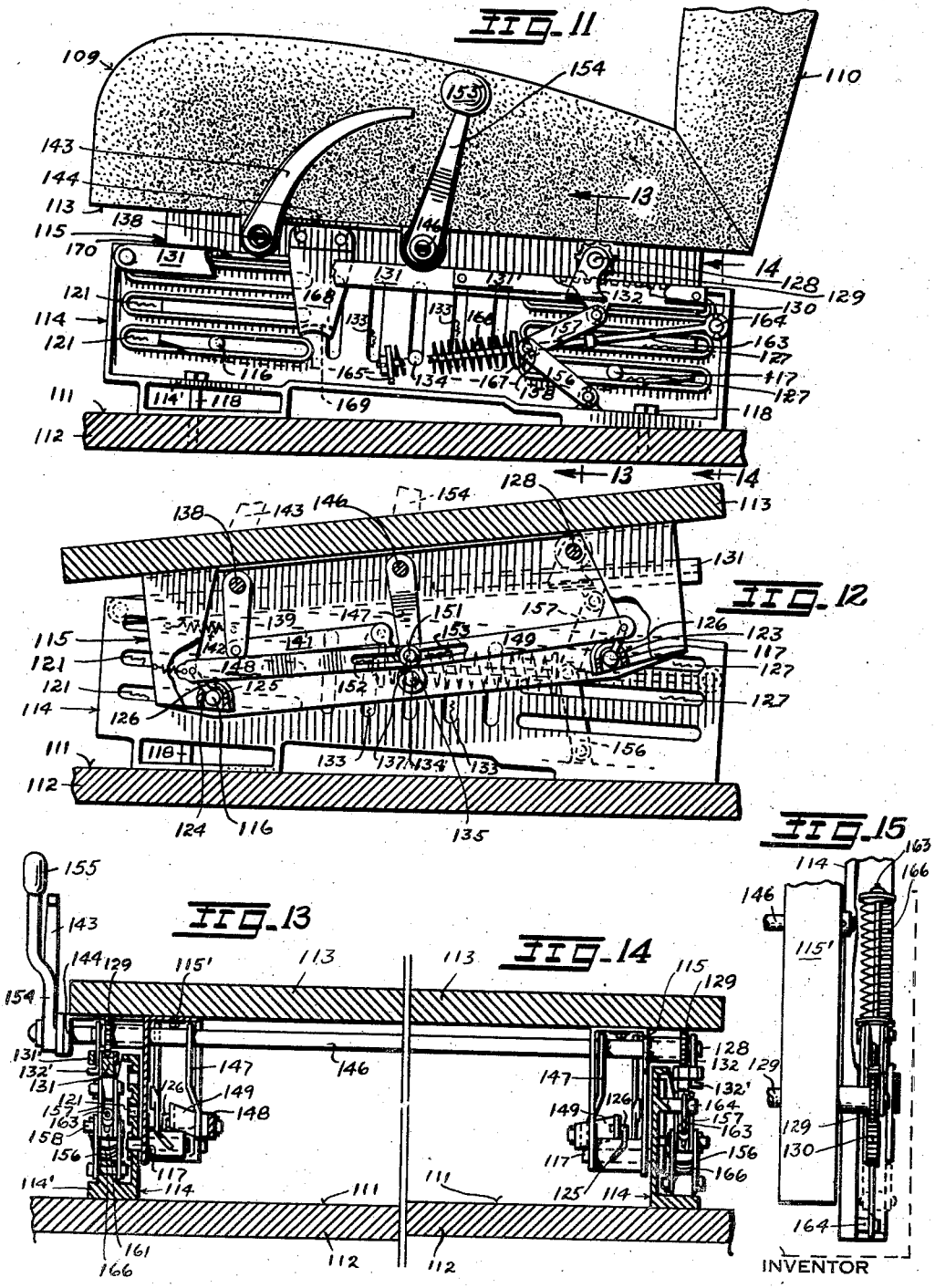

Patented Sept. 17, 1946

2,407,771

UNITED STATES PATENT OFFICE 2,407,771

SEAT SUPPORT

John P. De Rose, Albany, Calif.

Application August 4, 1941, Serial No. 405,279

8 Claims. (Cl. 155—14)

The invention relates to an adjustable seat support, and embodies certain improvements over the disclosures of my U. S. Patent No. 2,179,085, and my U. S. Patent No. 2,298,351.

A general object is to provide an improved seat mounting for height and/or angularity and/or fore-and-aft adjustments of the seat with respect to a fixed base of the mounting.

Another object is to provide a re-positioning control such that only corresponding adjustments are permitted at the opposite seat sides.

A further object is to provide for a resetting of the position-determining elements with a minimum of manual effort.

The invention possesses other objects and features of advantage, some of which, with the foregoing, will be set forth or be apparent in the following description of typical embodiments thereof, and in the accompanying drawings, in which, Figure 1 is a left-side view of an assembly of a seat and its mounting embodying the features of present invention and disposed on a supporting floor, the seat bottom being primarily shown as level, with other adjusted settings thereof being indicated in dash lines.

Figure 2 is a fragmentary upright section through the seat mounting structure with the seat tilted forwardly in one indicated position of Figure 1.

Figure 3 is a plan view of the seat support taken at the plane of the line 3—3 in Figure 1.

Figure 4 is a sectional elevation at the broken line 4—4 in Figure 3.

Figure 5 is a front view of the assembly of Figure 1, a major portion of the seat back being broken away.

Figures 6 and 7 and 8 are fragmentary sectional views taken respectively at the line 6—6 and 7—7 and 8—8 in Figure 2.

Figure 9 is an enlarged fragmentary plan section taken generally at the plane of support of a seat-carried section of the mounting upon a floor-carried section of the mounting when said sections are related as in Figure 1, said plane of support being indicated at the line 9—9 in Figure 10.

Figure 10 is a sectional elevation at the line 10—10 in Figure 9.

Figure 11 is a left-side view of another embodiment of the invention.

Figure 12 is a view of the seat-supporting structure of Figure 11 corresponding to the view of Figure 2.

Figures 13 and 14 are fragmentary sectional elevations at the lines 13—13 and 14—14 in Figure 9, the seat base being level.

Figure 15 is a fragmentary plan view of a portion of the support structure at the right side thereof.

In the embodiment of Figures 1 to 10 inclusive, features of present invention are disclosed in the structure of a seat unit which comprises a seat 9 having a back 10 and mounted on an adjustable support assembly which extends from a supporting surface 11 such as that provided by a floor 12. The seat 9 is of a usual upholstered type having a bottom plate or frame 13 for direct mounting on the adjustable support structure, the seat structure being rigid against distortion thereof. The present seat unit, while of general utility, has been particularly designed for its installation in a vehicle for use by an occupant thereof.

Essentially, the present seat support assembly comprises a pair of base members 14 for fixing to the floor 12 to extend upwardly therefrom, a pair of members 15 for fixing to the seat bottom 13 to depend therefrom, and a pair of catch bolts 16 and a rod 17 engaging both pairs of members 14 and 15 in a manner to support the former from the latter. The members 14 comprise plate elements of like size and outline having flanges 14' extending transversely therefrom at their bottom edges to provide floor bearings for the plates and a means by which the plates may be secured to the floor 12 in relatively fixed and mutually parallel relation, as by bolts 18. The members 15 comprise plates of like size and outline having transverse top edge flanges 15' by which they may be secured to the seat bottom 13, as by bolts 19, for their simultaneous disposal adjacent and parallel to the opposed inner faces of the plates 14, said flanges being directed inwardly and toward each other.

Near their upper edges and in front portions thereof, the plate members 14 are provided with like sets of interior slots 21 which are laterally spaced and extend parallel to the base edges of the members with corresponding said slots at like distances therefrom. At corresponding points thereof adjacent the junctures of their front and lower edges, the plate members 15 are provided with transverse guideways which slidably mount the catch-bolts 16 for their normal transverse projection from the plates 15 into corresponding slots 21 of the plates 14. The guideways for the bolts 16 comprise aligned openings in the plates 15 and in end portions 22 of brackets 23 extending rigidly from the inner sides of the plates 15, each said bracket having a cylindrically curved arm portion 24 extending above the bolt portion between the plate and the bracket portion 22.

An helical spiral slot 25 is provided in each bracket arm 24 and slidably receives an arm 26 extending rigidly from the bolt 16 and arranged to engage the forward slot end as a stop under the influence of a spring 27 when the bolt is operatively engaged in a slot 21 of the base member 14; the arrangement is such that a sufficient rotation of the bolt to move its arm 26 rearwardly in the slot 25 will withdraw the bolt from its operative position by reason of the sliding engagement of the bolt arm 26 with the forward edge of the slot 25, said edge functioning as a spiral cam. Such a rotation of the bolt to effect its inoperative disposal is arranged to be effected by means simultaneously operative upon both arms 26 and hereinafter described.

Near their upper edges and in rear portions thereof, the base members 14 are provided with interior openings comprising slots 28 extending parallel to the plate base and at like distances therefrom, and the members 15 are provided toward their rear ends with corresponding upright slots 29. The rod 17 is constantly engaged through the mutually intersecting pairs of slots 28 and 29 for its lateral sliding through these slots, is arranged to be adjustably spaced from the seat while extending freely through the upright slots 29, and constantly bears on the lower edges of the slots 28 as the support means for the rear of the seat.

With the support-bolts 16 engaged in corresponding slots 21 of the base members 14 and the rod 17 engaged in the horizontal slots 28 of the members, it will be understood that the seat is supported upon the base members 14 for its fore-and-aft adjustment while maintained in a set angularity and height relation to the supporting floor 12. To provide for a maximum degree of fore-and-aft adjustment for the seat, the slots 21 and 28 are of like length and have their centers spaced as the line of the bolts 16 is horizontally spaced from the rod 17. To insure equal fore-and-aft adjustments of the opposite seat sides, gears 31 are fixed on the extending ends of the rod 17 and constantly engage racks 32 fixed on the members 14 in parallel relation to their rear slots 28, the rod being freely rotatable and being cylindrical at its slot-engaging bearing portions to permit its rotation as the seat is shifted.

Each of the plates 14 is provided with a similar set of openings comprising upright and laterally spaced interior slots 33 intermediately of the sets of horizontal slots 21 and 28, and catch-bolts 34 normally project from the plates 15 to engage a said slot for securing the seat in fore-and-aft adjustment. The bolts 34 are slidably and rotatably mounted in bores provided in cylindrical bosses or brackets 35 which extend inwardly from intermediate points of the plates 15 near their bottoms. The upper sides of the bosses 35 are provided with spiral cam slots 36 which slidably receive arms 37 which extend radially from the bolts 34 and engage the outer ends of the slots 36 when the bolts are operatively engaged in corresponding slots 33 of the plate 14. The arrangement is like that for the control of the bolts 16 whereby an appropriate rotation of a bolt 34 is arranged to effect an inoperative disposal of the bolt.

The simultaneous release of the normally operative catch-bolts 34 to permit a fore-and-aft adjustment of the seat with respect to the base provided by the members 14 is arranged to be effected through an appropriate rocking of a rod or shaft 38 which is journalled in and between the plates 15 at corresponding forward and upper points thereof. As particularly shown, radial arms 39 extend fixedly from the rod 38 inwardly of and adjacent the plates 15 and generally downwardly from the rod, and links 41 connect the arms 39 with the extending ends of the bolt arms 37 whereby a rocking of the rod 38 may simultaneously withdraw both catch-bolts 34. Tension springs 42 extend between the arms 39 and anchorages on the plates 15 forwardly thereof to constantly and yieldingly urge, through the links 41 and bolt arms 37, the operative disposition of the bolts 34. At least one end of the control rod 38 extends beyond the adjacent base plate 14 and fixedly carries a radial arm 43 for use as a handle to effect a rocking of the rod 38 to simultaneously disengage the bolts 34 from the slots 33 of the plate; as shown, the handle 43 is positioned opposite the left side of the seat 9, and the rod 38 is supported thereat by a bracket 44 fixed to and beneath the bottom seat plate 13.

It will now be noted that the adjusted support of the back of the seat from the rod 17 is arranged to be effected through a device including like struts 45 which are cooperative in a common plane between the seat and block members 46 mounted on the rod and rotatably receiving the rod 17 therethrough, and are angularly adjustable with respect to the seat bottom. At their upper ends, the struts 45 mount rollers 47 which are arranged to constantly bear against the flat under faces of inwardly directed bearing plates 48 fixed beneath the seat and comprising extensions of the flanges 15' of the plates 15; and the lower strut ends are pivotally fixed to the blocks 46. Mutually parallel gusset plates 49 and 50 connect the front and rear edges of each bearing plate 48 with its plate 15 and define between them a guideway in which the block 46 is secured and guided for its rectilinear adjustment with respect to the seat. The arrangement is such that the seat is raised furthest from the rod 17 when the struts 45 are swung about their pivotal connections with the blocks toward upright positions thereof, and vice versa.

By particular reference to Figures 2 and 3 and 4 and 8 and 9, it will be noted that each block 46 is of general channel section having its sides 51 parallel and intermediately connected by a portion 52 which extends from the channel web 53 and is provided with a bore which receives the rod 17 for rotation therein. The strut 45 is forked and has its unforked end pivoted to and between the block sides 51 for the swinging of the strut about an axis perpendicular to the rod axis. The free fork ends receive the roller 47 between them for rotation about a pivot pin 54 engaged through said ends. At their outer faces the block sides 51 are provided with longitudinal guide ribs 55 which are complementarily engageable in the channels of like and oppositely-directed offsets 56 of the plates 49 and 50, whereby the blocks are guided by and between the plates for solely rectilinear movement to or from the seat which they carry.

Understanding that a swinging of a strut 45 to move the strut toward or from an upright position while the roller 47 thereof supportingly engages beneath the seat at a bearing plate 48 thereon is effective to respectively raise or lower the adjacent seat portion with respect to the fixed base assembly, means are provided to adjustably position and secure each strut for adjusting the seat height thereat. Preferably and as shown, the strut adjusting means is arranged to be simultaneously and correspondingly operative upon the struts 45 at both sides of the seat in such a manner that the supported rear seat portion may be and remain level laterally thereof for all its adjusted positions.

Essentially, the present means for adjusting the angularity of the struts 45 comprises a pair of rack bars 57 extending from pivotal connections with the different struts and having the teeth of their racks 58 constantly engaging opposite sides of a gear 59 fixed on a shaft 61 which is rotatably mounted on and beneath the seat bottom 13. As particularly disclosed in Figures 3 and 4, the racks 58 guidedly extend into a rectangular casing 62 at opposite sides of the gear 59 and with their teeth engaging the gear within the casing while the backs of the racks slidably engage the inner faces of opposite casing sides 63. The casing 62 is fixed to the seat bottom 13 intermediately of its sides to dispose the rack and gear assembly parallel thereto, and the gear shaft 61 is journalled in and between the opposed top and bottom sides of the casing in the common plane of adjustment of the struts 45.

Hinged connections are provided between the rack bars 57 and the struts 45; in the present instance, forks 64 fixed on the bar ends span each roller 47 and the strut end thereat, and receive the extremities of the pivot pins 54 to provide the hinged connection of the bars and struts. The rack bars are formed with offset portions 65 between the racks 58 and the forks 64 to provide for the engagement of their racks at opposite sides of the gear 59. Compression springs 66 encircle the bar portions between their racks 58 and the offsets 65 and are operatively engaged between the casing ends from which the bars extend and seat collars 66' adjustably fixed on the bars, said springs being constantly operative to urge an upward swinging of the struts 45 and a raising of the seat with a toggle jack action. Since the springs 66 constantly urge a disposal of the back of the seat in fully raised position when the seat is unoccupied, and the weight of an occupant of the seat may force the seat downwardly against the resistance of the springs to an intermediate or fully lowered position, means are provided for positively securing the back of the seat in any one of a number of adjusted positions with respect to the support base.

In the present instance, a means for securing the back of the seat at a desired adjusted height is cooperative between the blocks 46 on the shaft 17 and the plates 15 which are fixed to the seat and mount the plates 49 and 50. More specifically, the channel-like offsets 56 of the front guideway plates 49 are provided with corresponding transverse notches or kerfs 67 across them, the guide ribs 55 of the blocks 46 engaging in said offsets 56 are each provided with a plurality of notches 68 for selective registration with different notches 67 as the plate 15 is raised or lowered with respect to the block, and a dog 69 is provided for engaging a pair of registering notches 67 and 68 to positively support the back of the seat upon the rod 17. Each dog 69 is provided at the lower end of a swinging member 70 which has its upper end mounted on a pin 71 extending from the plate 49 for a swinging of the dog to or from an operative position in registering notches 67 and 68. A compression spring 72 is engaged between the member 70 and a seat on the plate 15 to constantly urge and normally maintain the operative engagement of the dog with a notch 68 of the block 46.

A rock shaft 73 is journalled in and between corresponding upper points of the depending seat plates 15 intermediate their lengths and in parallel relation to the rod 17. Arms 74 depend fixedly from the shaft 73 inwardly of and adjacent the plates to clear the bosses 35 for the bolts 34, and links 75 and 76 respectively connect the arms 74 with the arms 26 of the bolts 16 and with bottom points of the members 70 which provide the dogs 69. The arrangement is such that a rocking of the shaft 73 in one direction will effect a withdrawal of the bolts 16, while a rocking of the shaft in the opposite direction will effect an inoperative disposal of the dogs 69. Headed pins 77 on the arm 74 engage slots 78 and 79 in the links 75 and 76 respectively whereby a rocking of the shaft 73 to release the front or the back of the seat for its up or down adjustment does not simultaneously release the rear or front of the seat for its adjustment.

In the present structure, the shaft 73 extends beyond the left side of the seat 9 and carries an arm 81 fixed thereto and normally extending upwardly from the shaft, said arm being provided with a knob 82 to facilitate a manual rocking of the arm and shaft to selectively release the front or back of the seat in the described manner and as desired. With the present arrangement, a rearward rocking of the arm 81 is arranged to release the rear of the seat for adjustment, while a forward rocking of said arm releases the front of the seat for its adjustment. As shown, the support bracket 44 for the extending end of the control rod 38 also provides a support for the extending end of the shaft 73.

The described common means which is provided by the shaft 73 for selective actuation to simultaneously release the support bolts 16 to permit a height adjustment of the front of the seat or to simultaneously withdraw the dogs 69 to permit a height adjustment of the back of the seat obviously permits the release of the seat for only one of said adjustments at a time. Also, since the seat is of relatively rigid structure and is constantly supported at its back in parallel relation to the support rod 17, it is important to note that the front of the seat will remain parallel to the common line of the front bolts 16 during any adjustment thereof, whereby to insure an even front or rear adjustment of the seat with respect to its two sides.

Rather than depend on the application of a person's weight for setting the back of the seat in adjusted position against the joint resistance of the springs 66, means are preferably provided to positively actuate the rack bars 57 to effect the desired adjustment when the seat is free for vertical adjustment with respect to the rod 17. As particularly illustrated, the shaft 61 for the rack gear 59 carries a worm gear 84 which is engaged by a worm shaft 85 journalled on the under side of the casing 62 for its turning to project or withdraw the rack bars 57 as a positive height adjustment means for the back of the seat. Noting that the horizontal component of the supporting reaction of the struts 45 on the bars 57 may not rotate the worm shaft 85 if its thread pitch is low enough, the described arrangement may itself secure the struts 45 in set angular relation to the supported seat for adjustment only by turning the shaft; the latter is assumed in the present instance, whereby the support dogs 69 and their action and control might be omitted.

As brought out in Figure 3, the front end of the worm shaft 85 is arranged for engagement by a hand crank 86 for its manual turning with a high degree of mechanical advantage. In this manner, the manual effort required for effecting an adjustment at the rear of the seat is minimized.

Means may be provided in the described seat mounting structure for so limiting the raising of the seat above the floor as to maintain the operativeness of the support elements to coact with and between the base and seat. As particularly illustrated, a member 88 depends fixedly from the seat-carried plate 15 opposite the outer side of the plate 14 and is provided with a transverse bottom projection 89 directed toward the plate 14 and engageable with a projection 90 extending above it from a top part of the plate 14 when the seat is raised to its desired limiting height, the projection 90 being long enough in a fore-and-aft direction to insure its engagement by the projection 89 for all settings of the seat.

The embodiment of Figures 11 to 15 inclusive discloses a seat unit which comprises a seat 109 having a back 110 and mounted on an adjustable support assembly which is interposed between it and a supporting surface 111 such as that provided by a floor 112. The seat 109 has a flat bottom plate 113 which is mounted on the adjustable support structure, the seat structure being relatively rigid against twisting or bending distortion. While of general utility, the present seat unit has also been particularly designed for its installation in a vehicle, and comprises a pair of base members 114 for fixing to the floor 112 to extend upwardly therefrom, a pair of members 115 for fixing to the seat bottom 113 to depend therefrom, and front and rear pairs of bolts 116 and 117 each engaging a pair of adjacent members 114 and 115 at the different seat sides in a manner to support the latter members from the former. The members 114 comprise plate elements of like size and outline having base flanges 114' for seating on the floor to which they may be secured as by bolts 118. The members 115 comprise plates of like size and outline having transverse top edge flanges 115' at which they may be secured to the seat bottom 113 by bolts or the like, said plates being disposed adjacent and parallel to the interior face of the plates 114.

In front portions thereof, the plate members 114 are provided with like sets of mutually parallel interior slots 121 which are laterally spaced in upright lines and extend parallel to the top edges of the members, it being noted that the top edges of the plates 114 are angularly related to the bottom edges of the plates and slope downwardly from their front ends. At corresponding points thereof adjacent the junctures of their front and lower edges, the seat-carried plate members 115 are provided with transverse guideways which slidably mount the support bolts 116 for their normal transverse projection from the plates 115 into corresponding slots 121 of the plate 114. The guideways for the bolts 116 comprise aligned openings in the plates 115 and in brackets 123 extending rigidly from the inner sides of the plates 115, each said bracket having a cylindrically curved arm portion 124 overlying the bolt portion between the plate and its free extremity.

A spiral slot 125 is provided in each bracket arm 124 and slidably receives an arm 126 extending rigidly from the bolt 116 and arranged to engage the forward slot end as a stop when the bolt is operatively engaged in a slot 121 of the base member 114; the arrangement is such that a sufficient rotation of the bolt to move its arm 126 rearwardly in the slot 125 will withdraw the bolt from its operative position by reason of the sliding engagement of the bolt arm 126 with the forward edge of the slot 125. Such a rotation of the bolt to effect its inoperative disposal is arranged to be effected by a means simultaneously operative against both bolt arms 126 and hereinafter described.

The rear portions of the base members 114 are provided with like sets of interior slots 127 similar to the sets of slots 121, the latter slots being parallel to the former. At corresponding points thereof adjacent the junctures of their rear and lower edges, the plate members 115 are provided with transverse guideways which slidably mount the bolts 117 for their normal transverse projection from the plates 115 into corresponding slots 127 of the plates 115. Brackets 123 such as those which mount the bolts 116 are provided for the bolts 117 and are provided with spiral slots 125 receiving arms 126 extending laterally from the bolts 117 in the manner previously described for the bolts 116.

With the support bolts 116 engaged in corresponding forward slots 121 of the base members 114 and the support bolts 117 engaged in corresponding rear slots 127 of the members, it will be understood that the seat is supported upon the base members 114 for its fore-and-aft adjustment while it is maintained in a set angularity and height relation to the supporting floor 112. To provide for a maximum degree of fore-and-aft adjustment for the seat, the slots 121 and 127 of their different sets are of like length and have their centers spaced as the line of the bolts 116 is horizontally spaced from the line of the bolts 117.

As in the first embodiment, means are provided to insure equal fore-and-aft adjustments for the opposite seat sides. In the present structure, a shaft 128 is journalled in and between the plates 115 adjacent the seat and near the rear edge thereof in parallel relation to said edge, and the extending shaft ends mount gears 129 which are arranged to constantly engage the teeth of underlying racks 130 provided on rigid arms 131 pivoted to the base plates 114 adjacent their upper front corners for swinging, as the back of the seat is raised or lowered, about an axis which is parallel to the axis of swinging of the seat on the front support bolts 116, the shaft axis also being parallel to the latter axis. The present racks 130 are provided at appropriate upper edge portions of the arms 131, and means are provided to insure a constant operative engagement of the gears 129 with the opposed racks.

As particularly illustrated, members 132 depend from and rotatively receive the shaft 128 outwardly of and adjacent the gears 129 thereon and extend opposite the outer faces of the arms 131 to so engage the arms as to prevent a mutual separation of the gears and racks while permitting an adjusted positioning of the gear longitudinally of the racks. The members 132 are provided at their bottoms with outturned flanges 132' which are disposed beneath and adjacent the lower edges of strap-like members 131' having their extremities fixed to the arms 131 and having their intermediate portions spaced from and cooperative with said arms to provide guideways in which the members 132 are slidable longitudinally of the arms while the flanges 132' cooperate with the lower edges of the members 131' to maintain the desired constant engagement of the racks with the corresponding gears.

Each of the plates 114 is provided with a similar set of upright and laterally spaced interior slots 133 intermediately of the sets of horizontal slots 121 and 127, and bolts 134 normally project from each plate 115 to engage a said slot for securing the seat in fore-and-aft adjustment. The bolts 134 are slidably and rotatably mounted in bores provided in cylindrical bosses or brackets 135 which extend inwardly from intermediate points of the plates 115 near their bottoms. The upper sides of the bosses 135 are provided with spiral slots which slidably receive arms 137 which extend radially from the bolts 134 and engage the outer ends of the spiral slots when the bolts are operatively engaged in corresponding slots 133 of the plate 114. The arrangement is similar to that for the control of the support bolts 116 and 117, and of the bolts 16 and 34 of the first embodiment, and is such that an appropriate rotation of a bolt 134 is arranged, through the guided engagement of the arm 137 thereof in the slot of the boss 135 which carries it, to effect an inoperative disposal of the bolt.

The simultaneous release of the normally operative bolts 134 to permit a fore-and-aft adjustment of the seat with respect to the base provided by the members 114 is arranged to be effected through an appropriate rocking of a rod or shaft 138 which is journalled in and between the plates 115 at corresponding forward and upper points thereof and in parallel relation to the shaft 128. As particularly shown, radial arms 139 depend fixedly from the rod 138 inwardly of and adjacent the plates 115, and links 141 connect the arms 139 with the extending ends of the bolt arms 137 whereby a rocking of the rod 138 may simultaneously withdraw both bolts 134. Tension springs 142 extend between the arms 139 and anchorages on the plates 115 forwardly thereof to constantly and yieldingly urge, through the links 141 and bolt arms 137, the operative disposition of the bolts 134. At least one end of the control rod 138 extends beyond the adjacent base plate 114 and fixedly carries a radial arm 143 for use as a handle to effect a rocking of the rod to simultaneously disengage the bolts 134 from the slots 133 of the plate; as shown, the handle 143 is positioned opposite the left side of the seat 108, and the rod 138 is supported thereat by a bracket 144 fixed to and beneath the bottom seat plate 113.

A rock shaft 146 is journalled in and between corresponding upper points of the depending seat plates 115 intermediate their lengths and in parallel relation to the shaft 128. Arms 147 depend fixedly from the shaft 146 inwardly of the plates to clear the bosses 135 for the bolts 134, and links 148 and 149 respectively connect the arms 147 with the arms 126 of the bolts 116 and with the arms 131 of the bolts 117. The arrangement is such that a rocking of the shaft 146 in one direction will effect a withdrawal of the bolts 116, while a rocking of the shaft in the opposite direction will effect a withdrawal of the bolts 117. Headed pins 151 on the arms 147 engage slots 152 and 153 in the links 148 and 149 respectively whereby a rocking of the shaft 146 to release the front or the back of the seat for its up or down adjustment does not simultaneously release the rear or front of the seat for its adjustment.

In the present structure, the shaft 146 extends beyond the left side of the seat 109 and carries an arm 154 fixed thereto and normally extending upwardly from the shaft, said arm being provided with a knob 155 to facilitate a manual rocking of the arm and shaft to selectively release the front or back of the seat in the described manner and as desired. With the present arrangement, a rearward rocking of the arm 154 is arranged to release the rear of the seat for its adjustment, while a forward rocking of said arm releases the front of the seat for adjustment. As shown, the support bracket 144 for the extending end of the control rod 138 also provides a support for the extending end of the shaft 146.

Although vertical adjustments of the front or back of the seat 109 may be selectively effected by withdrawing the bolts 116 or 117 while manually supporting the freed front or rear seat edge, means are preferably provided for constantly urging a raised positioning of the back of the seat as an aid to positioning the same for the reengagement of the bolts 117 in corresponding slots 127 after an adjustment has been effected. As particularly shown, the means for urging an upward disposal of the back of the seat essentially comprises a toggle-jack arrangement at each seat end having links 156 and 157 respectively pivoted to the base flanges 114' and connected at a common pivot pin 158, and urged toward a mutually aligned relation in which the back of the seat would be fully raised by the action of a spring 166 which is appropriately operative with respect to said links.

The present links 156 and 157 are bipartite and span an intermediate portion 161 of the pin 158 which is provided with a diametral bore which freely receives a rod 163 pivoted on a stub shaft 164 at a rear point of the plate 114, said rod extending forwardly of the pin 158. A spring seat member 165 is adjustably mounted on the free end of the rod 163 and an helical compression spring 166 receives the rod and is constantly operative between the member 165 and a seat ring 167 mounted on the rod and engaging the link ends adjacent the pin 158. The arrangement is such that the springs 166 of the two toggle-jacks are jointly and equally operative to urge an upward raising of the rear of the seat for more than counterbalancing the supported seat weight. It will, of course, be obvious that the action of the springs 166 is utilized only during an adjustment of the back of the seat when the support bolts 177 are inoperative, and the seat is supported upon the jacks through the arms 131 and racks 130 and gears 129 and shaft 128.

Means are provided for preventing the raising of the seat 109 appreciably above the level at which the bolts 116 and 117 may respectively engage the top slots 121 and 128 of the base plates 115. As shown, a member 168 depends fixedly from each seat-carried plate 115 opposite the outer side of the adjacent base plate 14 and is provided with an inturned bottom projection 169 which underlies and is engageable with a projection 170 extending from the top part of the plate 114 when the desired limiting height of the seat is reached. The arrangement and stop action are substantially identical with those for the members 88 and 90 of the first described embodiment.

From the foregoing description of my invention, taken in connection with the accompanying drawings, the advantages of the construction and operation will be readily understood by those skilled in the art to which the invention appertains. While I have described the features and use of assemblies which I now consider to be preferred embodiments of my invention, I desire to have it understood that the showings are primarily illustrative, and that such changes may be made, when desired, as fall within the scope of the following claims.

I claim:

1. In combination with a seat, a seat-supporting means comprising transversely spaced plate members supported in upright position beneath the seat in fore-and-aft relation thereto and provided with like sets of vertically spaced horizontal slots, corresponding pairs of laterally spaced and horizontally disposed front and rear bolts reciprocably carried by the seat and normally disposed selectively in slots of the different plate members to cooperatively support the seat from the members in fixed angular and height adjustment while permitting its fore-and-aft adjustment, rack bars pivoted to said plate members at corresponding points thereof in generally horizontal disposition for swinging in planes parallel to the members and having their racks facing upwardly, a shaft rotatably carried by and beneath the seat crossways thereof and above the rack bars, gears on said shaft engaging the different said racks, and means operative to maintain the cooperative engagement of the gears and their racks whereby the seat is restrained to like movements thereat during a fore-and-aft adjustment thereof.

2. A structure in accordance with claim 1 having means constantly and resiliently operative through the rack bars and gears and shaft to urge a raised disposal of the seat.

3. In combination with a seat, a seat-supporting means comprising a base member, a support element supportedly engaging the base member at a fixed level thereof, a toggle strut hinged to said element and extending obliquely upwardly from its hinge point to a supporting contact with the seat, means operative to vary the obliquity of said strut for the support of the seat thereon at an adjusted height thereof, telescopically engaged guide members carried by the support element and seat respectively and cooperative to confine said element and seat to relative movement in a fixed line transverse to the seat, and a dogging means releasably operative between said guide members to secure the seat at its adjusted height.

4. In combination with a seat, a seat-supporting means comprising a base member disposed beneath a seat in fore-and-aft relation thereto, guide members on the seat and base member telescopically engaged to guide the seat for a rectilinearly adjusted spacing thereof with respect to the base member, a toggle strut hinged to the guide member and extending obliquely upwardly to slidably engage the seat for supporting it from the base member, and means on the seat operative against the strut to dispose and yieldingly fix the strut in angularly adjusted position with respect to the seat for providing a disposal of the seat at an adjusted height with respect to the base member.

5. A structure in accordance with claim 4 having a dogging means releasably fixing the relatively adjusted guide members against relative movement.

6. In combination with a seat, a seat-supporting means comprising a base member disposed beneath a seat in fore-and-aft relation thereto and provided with a horizontal support face, a seat support element supportedly engaged with said face for fore-and-aft adjustment along it, members on the seat and support element telescopically engaged to guide the element and seat for a rectilinearly adjusted spacing thereof, a toggle strut hinged to the guide member on said support element and extending obliquely upwardly to slidably engage the seat for supporting the seat from the element, and means on the seat operative against the strut to dispose and fix it in angularly adjusted position with respect to the seat for providing a setting of the seat at an adjusted height with respect to the base member.

7. In combination with a seat, a seat-supporting means comprising relatively fixed and transversely spaced base members disposed beneath the seat in fore-and-aft relation thereto and provided with mutually coplanar horizontal support faces, a support element supportedly resting upon said faces and movable therealong, complementary toggle struts hinged to the support element and extending obliquely upwardly from their hinge points to have their upper ends supportingly and slidably engage the seat, and means on the seat operative against the struts at their upper ends and adjustable to adjust the mutual spacing of the upper strut ends to change the obliquity of the struts and thereby adjust the spacing of the seat from the element.

8. In combination with a seat, a seat-supporting means comprising a pair of transversely spaced and relatively fixed base members disposed in opposed relation beneath the seat and extending in fore-and-aft relation thereto, a pair of complementary upwardly extending obliquely disposed laterally spaced toggle struts of equal length lying in the same vertical plane and each hinged to a different base member for pivotal movement toward and away from each other, said toggle struts having their upper ends supportingly and slidably engaging the seat, and means including a gear and racks spanning the distance between and connecting the upper strut ends and adjustable to move the upper strut ends toward or away from each other to change the obliquity of the struts and thereby adjust the spacing of the seat from the base members.

JOHN P. DE ROSE.